July 10, 1923.

J. P. TURNER

HORSESHOEING DEVICE

Filed May 23, 1921

Inventor

James P. Turner

By *[signature]*

Attorney

July 10, 1923.
J. P. TURNER
HORSESHOEING DEVICE
Filed May 23, 1921
1,461,297
2 Sheets-Sheet 2
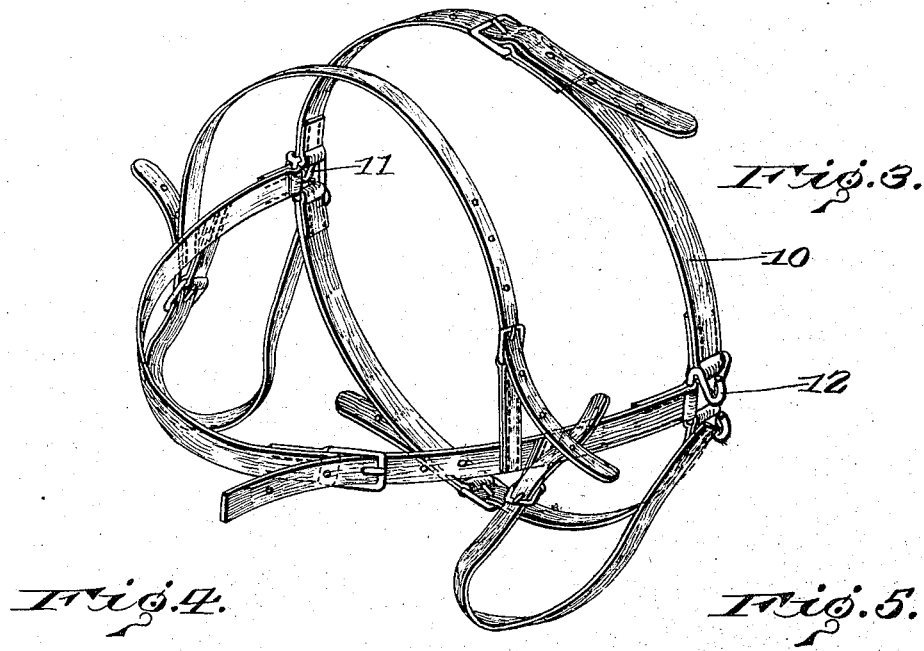
Inventor
James P. Turner Patented July 10, 1923.

1,461,297

UNITED STATES PATENT OFFICE.

JAMES P. TURNER, OF FAULKTON, SOUTH DAKOTA.

HORSESHOEING DEVICE.

Application filed May 23, 1921. Serial No. 471,649.

*To all whom it may concern:*

Be it known that I, JAMES P. TURNER, a citizen of the United States, residing at Faulkton, in the county of Faulk, State of South Dakota, have invented certain new and useful Improvements in Horseshoeing Devices; and I do hereby declare the following to be a full, clear, and exact description of the invention, such as will enable others skilled in the art to which it appertains to make and use the same.

This invention relates to new and useful improvements in harness, and particularly to harness used in horseshoeing.

One object of the invention is to provide a harness which has means whereby any one of a horse's legs can be drawn up and held in proper position for applying a shoe.

Another object is to provide a device of this character which is especially useful when shoeing horses out-side of a building, where no provisions are made for facilitating the shoeing operation.

A further object is to provide a device of this character whereby a refractory animal may be easily handled, so that it may be shod.

Other objects and advantages will be apparent from the following description when taken in connection with the accompanying drawings.

In the drawings:

Figure 3 is a perspective view of the harness removed from the horse.

Figure 4 is an enlarged vertical sectional view through the leg clamping device, the same being in closed position.

Figure 5 is an enlarged vertical sectional view of the tail clamp.

Referring particularly to the accompanying drawings, 10 represents a suitable harness, which is disposed on the fore part of the horse, the sides of the harness having the hooks 11 and 12, to which reference will be particularly made later herein.

Figure 1:
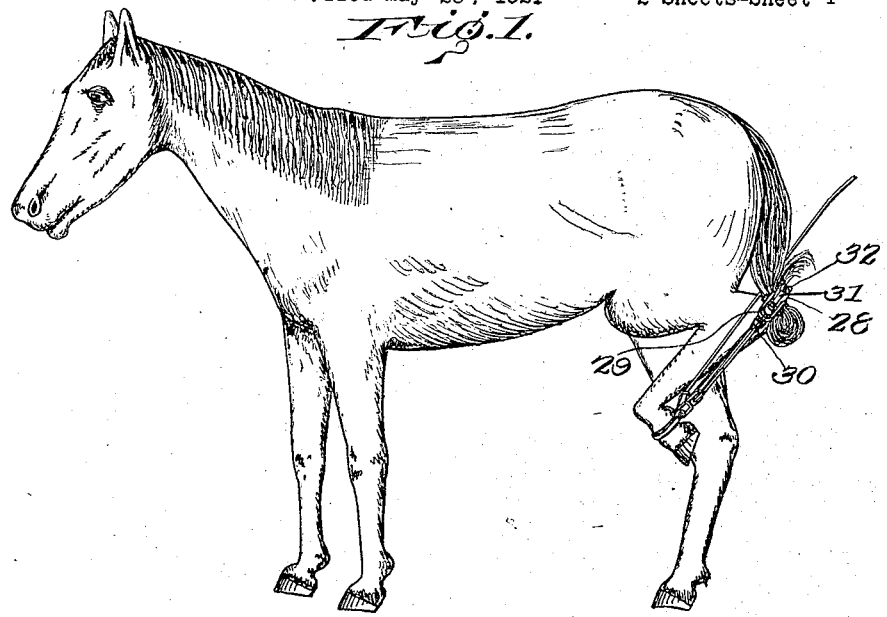
Figure 1 is a side elevation of a horse showing the device in operation upon the hind leg, the leg being elevated into shoeing position.

The leg clamp includes a pair of crossed and pivoted members each having a shank 13 and a curved jaw portion 14, the pivot being shown at 21'. The shank 13 is bifurcated and receives the shank 14 therethrough, the said shank 14 carrying a pivoted spring pressed pawl 15 for engagement with a notch 16 formed in the adjacent portion of the shank 13, which pawl, when so engaged, will hold the parts in embracing engagement around the leg of the horse, as shown in Figure 1. Pivotally connected to the end of the shank 13 is a pulley block 17, while a pulley 18 is mounted in the corresponding end of the shank 14. Pivotally mounted within the shank 13 is an angle member 19, the upper leg 19' of which is adapted to engage with a transverse pin 20, carried by and extending across the bifurcation of the shank 14. A coil spring 19'' is carried by the shank 13, and engages the member 19, to urge its upper arm toward the pin 20. The other leg of the member 19 is arranged to extend horizontally between the jaws, when the device is open, and is arranged to be engaged by the leg of the horse when the device is moved into straddling relation to the horse's leg, and pushed inwardly, to release the first-named leg of the member 19, and permit the jaws to close around the horse's leg. On the pivot 21', inwardly of the sides of the shank 13, are the coil springs 21, each having its ends bearing against the shank 13, and in openings 38, in the shank 14, respectively. On the shank 14, and extending transversely thereof, is a pin 35, around which is coiled a spring 36, the ends of said spring engaging, respectively, with the inner end portion of the shank 13, and with a second transverse pin 37, carried by the shank 14. Either of these springs may be dispensed with, or both may be used, to urge the jaws into closed position.

Pivotally mounted in the leg or shank 14, adjacent the pulley 18, is a spring pressed wedge member 22 which, when the jaws are closed, and the pawl 15 engaged in the notch 16, bites into the rope 23, which is engaged through the pulley, to hold the rope against movement. When, however, the pawl 15 is pulled away from the notch 16, and the jaws swung open, the shank 13 will press the pawl outwardly. A cord 24 is secured to an eye 25, carried by the wedge member, and passes through an eye 26 on the back of the pawl, and through a pulley 13' on the shank 13, so that when this cord is pulled, the wedge member will be lifted and the pawl pulled from its notch. The rope 23 can then pass freely over the pulley, in either direction. The rope 23 can, however, be drawn in one direction when the jaws are closed, to permit the elevation of the leg clamping device, and the lifting of the horse's leg, from the ground. When the cord 24 is pulled it releases the pawl 15, and upon further pulling on the cord the jaws will be drawn open and the device removed from the leg of the horse. To the outer edge of the jaw of the shank 14 is secured a pole 27, to permit the operator to place the device on the horse's leg, from a safe distance, should the animal be vicious.

Figure 2:
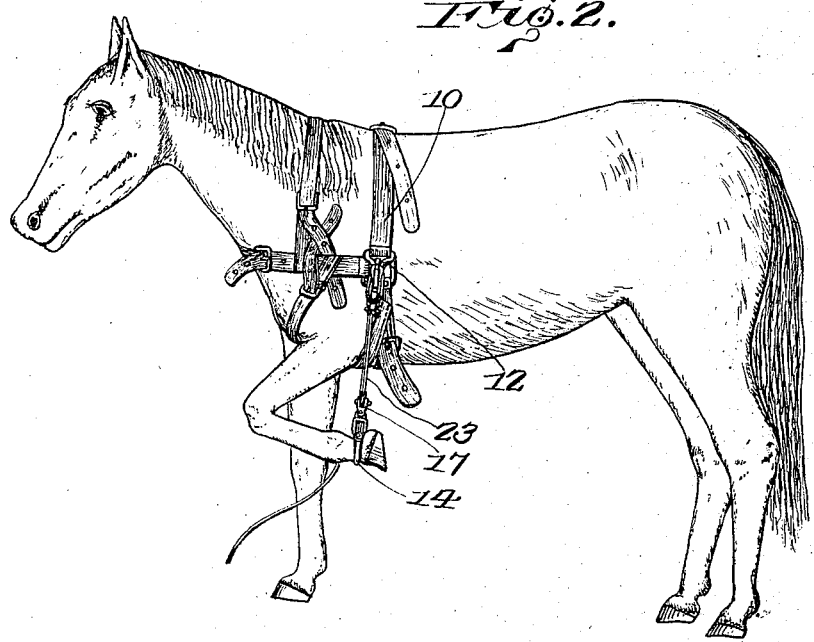
Figure 2 is a similar view showing the device in operative position with respect to the front leg of the horse.

When the device is used in connection with the front legs of the animal, the clasp shown in Figure 5 is employed, and in the manner illustrated in Figure 2.

This clamp comprises a pair of yoke members 28 and 29 disposed in crossed and pivoted relation, the outer end of the shank of the member 28 having a grooved wheel 30 rotatably supported therein. Pivotally connected at 28' to the bight portion of the member 28 is an arm 31, and to the said arm, at one side of its pivot point, is pivotally mounted a locking hook 32 for engagement with the bight portion of the other member 29. Secured to the arm 31, and properly bent to engage with the pivot bolt 33, of the members 28 and 29, when in clamping position, is a leaf spring 34.

In applying this clamp to the tail of the horse, the hair of the tail, below the fleshy portion, is turned or bent upwardly, and the jaws of the clamp placed in embracing relation to the hair of the tail. The hook 32 is then engaged with the bight portion of the member 29, and the arm 31 swung downwardly to engage the spring 34 with the pivot bolt 33. The device is thus firmly clamped onto the tail, and by reason of the thickness of the bent portion of the hair, cannot slip down from the tail. The rope 23 is secured at one end to the bight portion of the member 29, passed around the pulley of the pulley block 17, thence back around the pulley or wheel 30, and finally around the pulley 18, and out for pulling operation by the operator.

After the clamp has been properly engaged with the tail, the operator grasps the pole 37 and, after the jaws of the leg clamp have been swung open and locked in such position, the jaws of this clamp are placed around the animal's leg, above the hoof, and the clamp pressed thereagainst so that the member 19 will be released and the jaws permitted to close around the leg. The pawl 15 immediately enters the notch 16 and holds the jaws in embracing engagement around the animal's leg. The operator then pulls on the rope 23, which readily slides through the different pulleys, drawing the leg clamp upwardly toward the tail clamp, with the result that the animal's leg will be elevated into shoeing position, as clearly seen in Figure 1. After the foot has been shod, the operator pulls the cord 24, the initial movement of which releases the wedge member 22 so that the rope 23 will be released and the animal's leg, permitted to drop to the ground, after which the further pulling of the cord 24 releases the pawl 15, and permits the jaws to swing open and free the animal's foot.

When the device is used on the front legs, the bight portion of the member 29 is engaged with one of the hooks 11 and 12, of the harness, and the hook 32 engaged with the hook 11 or 12, after which the arm 31 is swung to engage its spring 34 with the bolt 33. The leg clamp is then applied to the front leg of the animal, and the leg drawn up, in the same manner as described in connection with the hind leg.

While the clamp is attached to the tail, by swinging the leg clamp around at the rear of the horse, the other hind leg may be lifted, without detaching the device from the tail.

What is claimed is:

1. A device for lifting the leg of an animal comprising a tail engaging clamp, a leg engaging clamp, means connecting the clamps and manually operable to raise the animal's leg from the ground, and a releasable locking means on the leg clamp for automatically engaging and holding the raising means and operable from a distance from the animal for the safety of the operator.

2. In a device of the class described, the combination with a clamp for engagement with a part of an animal, of a leg engaging and raising means including a pair of pivotally connected members having leg embracing jaws, an automatically operating locking member carried by one of the members and arranged to engage with the other member when the jaws are in open position, said locking member being arranged to be released upon contact with the animal's leg to permit the jaws to embrace the leg, a block and tackle mechanism between the clamps, a wedge member on the leg clamp engaging with the cable of the block and tackle mechanism to hold the leg clamp in elevated position, a pawl for holding the jaws in closed position, and a cord for simultaneously releasing the pawl and the wedge member to permit lowering of the leg clamp.

3. In a device of the class described, a clamp for engagement with a part of an animal to be shod, a leg clamp, means for applying the leg clamp to the leg of an animal from a safe distance, a releasable detent carried by the leg clamp normally holding the clamp in open position and releasable by contact with the animal's leg to permit the clamp to close about the leg, adjustable connections between the clamps for moving the leg clamp toward and away from the first clamp, and means operable from a distance for releasing the detent to permit the leg clamp, together with the animal's leg to fall to the ground.

In testimony whereof I affix my signature in the presence of two witnesses.

JAMES P. TURNER.

Witnesses:
A. M. MOORE,
F. M. MOORE.